United States Patent [19]

Naae

[11] Patent Number: 5,027,898
[45] Date of Patent: Jul. 2, 1991

[54] FOAMING AGENTS FOR CARBON DIOXIDE AND STEAM FLOODS

[75] Inventor: Douglas G. Naae, Houston, Tex.

[73] Assignee: Texaco Inc., White Plains, N.Y.

[21] Appl. No.: 539,507

[22] Filed: Jun. 18, 1990

[51] Int. Cl.$^5$ .................. E21B 43/22; E21B 43/24
[52] U.S. Cl. ............................. 166/272; 166/268; 166/273; 166/274; 166/294; 166/303; 166/305.1
[58] Field of Search ............. 166/268, 269, 272, 273, 166/274, 275, 294, 303, 305.1; 252/8.554

[56] References Cited

U.S. PATENT DOCUMENTS

| | | | |
|---|---|---|---|
| 4,540,050 | 9/1985 | Huang et al. | 166/272 |
| 4,703,797 | 11/1987 | Djabbarah | 166/274 X |
| 4,706,750 | 11/1987 | Buckles | 166/274 X |
| 4,706,752 | 11/1987 | Holm | 166/274 X |
| 4,787,454 | 11/1988 | Naae et al. | 166/274 |
| 4,821,803 | 4/1989 | Debons | 166/273 |
| 4,828,032 | 5/1989 | Teletzke et al. | 166/274 X |
| 4,856,589 | 8/1989 | Kuhlman et al. | 252/8.554 X |

Primary Examiner—George A. Suchfield
Attorney, Agent, or Firm—Jack H. Park; Kenneth R. Priem; Harold J. Delhommer

[57] ABSTRACT

The invention is a foam method for improving conformance during a steam flood or carbon dioxide flood in an underground hydrocarbon formation penetrated by at least one injection well and at least one production well, which comprises injecting into an injection well about 0.05% to about 2% by weight aqueous surfactant solution, and then injecting into the injection well a flooding medium of steam or carbon dioxide, said surfactant solution comprising a surfactant having the formula $$R(C_2H_4O)_nSO^4 \, M^+$$

where R is a lignin phenol produced by reducing lignin in the presence of a reducing agent of carbon monoxide or hydrogen at a temperature greater than about 200° C. and a pressure greater than about 100 psi, n has an average value of about 2 to about 25, and $M^+$ is an alkali metal or ammonium cation.

11 Claims, No Drawings

FOAMING AGENTS FOR CARBON DIOXIDE AND STEAM FLOODS

BACKGROUND OF THE INVENTION

The present invention relates to a group of foaming agents which when injected in combination with steam or carbon dioxide will significantly improve conformance.

When an oil reservoir is subjected to steam injection, steam tends to move up in the formation, whereas condensate and oil tend to move down due to the density difference between the fluids. Gradually, a steam override condition develops, in which the injected steam sweeps the upper portion of the formation but leaves the lower portion untouched. Injected steam will tend to follow the path of least resistance from the injection well to a production well. Thus, areas of high permeability will receive more and more of the injected steam which further raises the permeability of such areas. This phenomenon exists to an even larger degree with low injection rates and thick formations. The steam override problem worsens at greater radial distances from the injection well because steam flux decreases with increasing steam zone radius.

Although residual oil saturation in the steam swept region can be as low as 10%, the average residual oil saturation in the formation remains much higher due to poor vertical conformance. Thus it is because of the creation of steam override zones that vertical conformance in steam floods is usually poor.

A similar conformance problem exists with carbon dioxide flooding. Carbon dioxide has a great tendency to channel through oil-in-place since carbon dioxide viscosity may be 10 to 50 times lower than the viscosity of the oil-in-place. This problem of channeling through oil is exacerbated by the inherent tendency of a highly mobile fluid such as carbon dioxide to preferentially flow through more permeable rock sections. These 10 two factors, unfavorable mobility ratios between carbon dioxide and the oil in place and the tendency of carbon dioxide to take advantage of permeability variations, often make carbon dioxide flooding uneconomical. Conformance problems increase as the miscibility of the carbon dioxide with the oil-in-place decreases.

Although not much attention has been devoted to carbon dioxide conformance, it has long been the concern of the oil industry to improve the conformance of a steam flood by reducing the permeability of the steam swept zone by various means. The injection of numerous chemicals such as foams, foaming solutions, gelling solutions or plugging or precipitating solutions have been tried. Because of the danger of damaging the reservoir, it is considered important to have a non-permanent means of lowering permeability in the steam override zones. For this reason, certain plugging agents are deemed not acceptable. In order to successfully divert steam and improve vertical conformance, the injected chemical should be (1) stable at high steam temperatures of about 300° to about 600° F., (2) effective in reducing permeability in steam swept zones, (3) non-damaging to the oil reservoir and (4) economical.

The literature is replete with references to various foaming agents which are employed to lower permeability in steam swept zones. The foaming agents of the prior art require the injection of a non-condensable gas to generate the foam in conjunction with the injection of steam and the foaming agent. U.S. Pat. Nos. 3,366,175 and 3,376,924 disclose the injection of a steam foam in a hydrocarbon reservoir at the interface between the hydrocarbons and the gas cap to aid in recovery. U.S. Pat. Nos. 3,410,344 and 3,994,345 disclose the use of a steam foaming agent selected from the generic groups of polyethoxyalkanols and alkylaryl sulfonates to reduce permeability in steam channels. The use of similar surfactants such as sodium lauryl sulfoacetate and alkyl polyethylene oxide sulfate are disclosed as foaming agents in carbon dioxide foams in U.S. Pat. Nos. 4,088,190 and 4,113,011, respectively. U.S. Pat. No. 4,018,278 discloses the use of sulfonated, ethoxylated alcohols or alkylphenols in surfactant flooding solutions without the use of steam.

Several trademarked foaming agents have been field tested by petroleum companies in steam floods. These include such trademarked chemicals as Stepanflo 30 sold by Stepan Chemical Co., Suntech IV sold by Sun Oil, Thermophoam BWD sold by Farbest Co. and COR-180 sold by Chemical Oil Recovery Co. U.S. Pat. No. 4,086,964 disclosed the use of lignin sulfonates for a foaming agent and U.S. Pat. No. 4,393,937 discloses the use of alpha olefin sulfonates as a steam foaming agent. See also United Kingdom Pat. No. 2,095,309 for a disclosure of alpha olefin sulfonate foaming agents.

Disclosures of laboratory and field tests of Stepanflo are contained in SPE Paper No. 10774 entitled "The Laboratory Development and Field Testing of Steam/Noncondensable Gas Foams for Mobility Control in Heavy Oil Recovery" by Richard E. Dilgren et al. presented at the 1982 California Regional Meeting of the SPE held in San Francisco March 25–26, 1982 and the Journal of Petroleum Technology, July 1982, page 1535 et seq. The same Journal of Petroleum Technology also discusses tests conducted on Thermophoam BWD. Additional information on tests of Thermophoam BWD are also disclosed in Department of Energy Publications DOE/SF-10761-1, -2 and -3.

Tests of the COR-180 foaming agent of Chemical Oil Recovery Co. are disclosed in SPE Paper No. 11806 entitled "Improvement in Sweep Efficiencies in Thermal Oil-Recovery Projects through the Application of In-Situ Foams" by R. L. Eson, presented at the International Symposium on Oil Field and Geothermal Chemistry in Denver, June 1–3, 1983 and Department of Energy Reports Nos. DOE/SF/10762-1, -2, -3.

U.S. Pat. Nos. 4,540,049; 4,540,050; and 4,577,688 disclose the injection of a group of novel steam foaming agents for injection with steam to decrease permeability in steam swept zones. The steam foaming agents have the general formula:

$$RO(R-O)_n R''SO_3 M$$

where R is an alkyl radical, branched or linear, or an alkylbenzene, alkyltoluene or alkylxylene group, having from about 8 to about 24 carbon atoms in the alkyl chain, R' is ethyl, propyl or a mixture of ethyl and propyl, n has an average value of about 1 to about 20, R'' is ethyl, propyl, hydroxypropyl or butyl and M is an alkali metal or ammonium ion.

U.S. Pat. Nos. 4,739,040 and 4,787,454 disclose novel lignin phenol surfactant compounds and their use in hydrocarbon recovery. In these two references, the lignin phenol surfactants are produced by reducing lignin in the presence of a carbon monoxide or hydrogen reducing agent at high temperature and pressure to produce low molecular weight lignin phenols, and then subjecting the lignin phenols to one or a combination of several reactions such as alkoxylation, alkylation, sulfonation, sulfation, alkoxysulfation, and sulfomethylation.

SUMMARY OF THE INVENTION

The invention is a method for improving conformance during a steam flood or carbon dioxide flood in an underground hydrocarbon formation penetrated by at least one injection well and at least one production well. The method comprises injecting into an injection well about 0.05% to about 2% by weight aqueous surfactant solution, and then injecting into the injection well a flooding medium of steam or carbon dioxide. The aqueous surfactant solution comprises a surfactant having the formula $$R(C_2H_4O)_n SO_4^- M^+$$

where R is a lignin phenol produced by reducing lignin in the presence of a reducing agent of carbon monoxide or hydrogen at a temperature greater than about 200° C. and a pressure greater than about 100 psi, n has an average value of about 2 to about 25, and $M^+$ is an alkali metal or ammonium cation; and injecting into the injection well a flooding medium of steam or carbon dioxide.

Preferably, the flooding medium of steam or carbon dioxide is concurrently injected with the aqueous surfactant solution. It is also desirable to concurrently inject a non-condensible gas with the surfactant, especially when the flooding medium is steam.

DETAILED DESCRIPTION

The steam and carbon dioxide foaming agents of the present invention are highly effective in reducing the permeability of flood swept zones. These novel foaming agents have an affinity for formation areas of high permeability and low oil saturation. When set up in such areas, they substantially reduce the permeability of the swept zones, forcing steam or carbon dioxide into other, unswept areas of the formation.

The novel foaming agents of the present invention are represented by the general chemical formula:

$$R(C_2H_4O)_n SO_4^- M^+$$

where R is a lignin phenol produced by reducing lignin in the presence of a reducing agent of carbon monoxide or hydrogen at a temperature greater than about 200° C. and a pressure greater than about 100 psi, n has an average value of about 2 to about 25, and $M^+$ is an alkali metal or ammonium cation.

The preferred alkali metal ions are sodium, lithium and potassium. It should be noted that n is an average value and that the invention compounds will normally have varying degrees of ethoxylation.

Some foaming agents are also effective in minimizing carbon dioxide mobility. Although water has been used to reduce carbon dioxide mobility in the past, the problem has been that water also traps the oil. Injecting water additionally leads to increased water flow at the producing well and decreases the release of oil by carbon dioxide. Foam offers advantages over water injection.

Since most carbon dioxide foams are 85 to 95 percent gas, only a small amount of undesirable water is used to reduce carbon dioxide mobility. Second, foam viscosity is greater than the viscosity of its components and foam viscosity increases with the diameter of the capillaries in the rock matrix. Both of these factors favor greater oil recovery because increased viscosity improves the mobility ratio in a flood.

Third, foam also increases trapped gas saturation, and as gas saturation increases, oil saturation decreases. A high trapped gas saturation will usually reduce gas mobility.

Fourth, the surface activity of the foam lowers the water/oil interfacial tension and promotes wetting of oil wet surfaces. Fifth, foams form more readily where oil saturation is low and water saturation is high. Thus, foams have the greatest effect in water flooded zones. All of these properties of foams indicate that they should be useful in increasing carbon dioxide flooding conformance by reducing mobility and fingering.

When used for steam flooding purposes, it is possible to generate a foam with the injection of surfactant solution and subsequent injection of steam without a non-condensable gas or by the coinjection of surfactant and steam. The water vapor of the steam will create a foam with the foaming agent, but that foam will not be as significant or as stable as a foam generated with a non-condensable gas. Preferably, the noncondensable gas is injected with the foaming agent, and most preferably, concurrently with the foaming agent and the steam. In the case of carbon dioxide flooding, the flooding medium itself preferably doubles as the non-condensable gas.

The mixture of flooding medium, foaming agent, and optional non-condensable gas can bring about a substantial reduction in permeability when injected into the high permeability areas of the formation at almost any time. Conformance will be significantly improved whether the foaming agent and gas are injected into the formation at the very beginning of steam or carbon dioxide injection, before steam or carbon dioxide breakthrough at the production well, or after breakthrough. The most preferred injection times occur after injection has begin and shortly before breakthrough will occur at the production wells. In the first instance, the injection of steam foaming agent and gas or carbon dioxide foaming agent near the beginning of injection will help prevent narrow channels from being formed and extended through to the production wells. The injection of the foaming agent prior to breakthrough will postpone the time of breakthrough and spread the flooding medium over a wider area near the production wells.

The invention foaming agents will also work quite well if steam or carbon dioxide breakthrough occurred in the past and low oil saturation zones exist. But in such a situation, the foaming agent must be injected in larger concentrations and greater quantities to reduce permeability in a frequent swept area. Generally, the preferred mixture of steam, gas and foaming agent, or carbon dioxide and foaming agent must be injected into the reservoir at a higher pressure than the previous injection of steam or carbon dioxide so that the foam will travel a sufficient distance into the high permeability areas. However, the injection pressure must be less than the reservoir fracturing pressure or damage to the formation will occur.

The foaming agent and gas may be injected into the formation without the concurrent injection of steam, provided that steam is injected into the formation prior to and after the injection of the foaming agent and gas. But preferably, the steam is coinjected with the foaming agent and gas. Similarly, the foaming agent may be injected without the concurrent injection of carbon dioxide, provided that carbon dioxide is injected into the formation after the injection of the foaming agent.

In steam flooding, the foaming agent, non-condensable gas and steam should be injected in a mixture such that the foaming agent comprises about 0.05% to about 5% preferably about 0.1% to about 1.0% by weight of the steam (cold water equivalent). The foaming mixture contains about 0.01 to about 5, preferably about 0.01 to about 1.5 thousand standard cubic feet of a non-condensable gas per barrel of steam (cold water equivalent). It is contemplated that the injected steam range from about 20% to about 90% quality. A higher concentration of foaming agent is generally necessary if the region has been swept by steam for a considerable time. But individual tests should be run to tailor the concentration of the foaming agent in steam as the increased effectiveness of the foaming agent per increased concentration of foaming agent quickly reaches a point of diminishing returns. Furthermore, other surfactants may also be included in the steam and foaming agent mixture to increase oil recovery providing they do not substantially inhibit the foam.

The lignin phenol nucleus of the ethoxy sulfated foaming agent is produced in a single step process from lignin. The lignin is reduced at elevated temperature and pressure in the presence of carbon monoxide or hydrogen to yield a lignin phenol. The lignin phenol is then ethoxylated and sulfated to produce the foaming agent.

When used herein, the term "lignin phenol" refers to the reduction product of lignin which is reduced in the presence of carbon monoxide or hydrogen at a temperature greater than about 200° C. and a pressure greater than about 100 psi.

The reductive degradation of lignin under these selected conditions produces a complex mixture of low molecular weight lignin phenols that are generally derived from or based on a propylphenol structure which has high solubility in organic solvents. Analysis of the lignin phenol reaction product indicates an average molecular weight of about 300 and a range of about 150 to about 1000, compared to a propylphenol molecular weight of 136 and lignin molecular weight of 3000 to 15,000. It is believed that the lignin phenol product is composed of 2, 3, 4, or more propane phenols linked or fused together plus assorted methoxyls, hydroxyls and other oxygens. Whenever the phrase "lignin phenol" is used herein, it refers to the above product mixture and not propylphenol.

The reduction reaction is carried out by placing a lignin in contact with water. The lignin may be dissolved or slurried in aqueous medium at concentrations preferably ranging from about 5% to about 20% by weight. Sodium hydroxide or a similar compound may also be placed in the aqueous medium in a concentration of about 1% to about 15% by weight to increase lignin solubility. The reducing agent is injected into the reaction vessel to blanket the reduction reaction mixture at an initial pressure greater than about 100 psi, preferably greater than about 500 psi. The reducing gas is preferably carbon monoxide or hydrogen or a mixture of both.

A pasting oil can be used as the solvent for the lignin reduction reaction. This embodiment does away with the need for a later separation step from water in some cases before proceeding with the final reactions. But it is still necessary to contact the lignin with a relatively small amount of water for an effective reduction to take place.

A catalyst may be employed to increase the yield. A ferrous salt is the preferred catalyst for hydrogenation of lignosulfonate. Other metal ions which may be used to catalyze the lignosulfonate hydrogenation are: cobalt, molybdenum, nickel, and aluminum. When it is desired to reduce kraft lignin, alkali lignin, or desulfonated lignosulfonate by hydrogenation, it is preferred to use about 1% to about 15% by weight of a Raney nickel catalyst, based o the weight of the kraft lignin.

In general, the hydrogen reduction reaction should be allowed to proceed at reaction temperature and pressure for a period of about 30 minutes to about 5 hours and the carbon monoxide reduction for a time period of about 15 minutes to about 2 hours. The oil soluble lignin phenols can then be extracted from the reduction reaction mixture with organic solvent. Preferred solvents are ether, diethylether, tetrahydrofuran, benzene and toluene. The lignin phenols may then be ethoxylated and sulfated by means known in the art.

Of the various ways to sulfate lignin phenols, two sulfation reactions are the most preferred. Excellent results have been achieved by sulfating with trimethylamine-sulfur trioxide complex ($Me_3NSO_3$) and by sulfating with chlorosulfonic acid ($ClSO_3H$) in an anhydrous reaction media.

The reduction of lignin by hydrogen and carbon monoxide and the ethoxylation and sulfation of lignin phenols is discussed in detail in U.S. Pat. No. 4,739,040, the disclosure of which is incorporated herein by reference.

In general, the non-condensable gas used in the foam mixture of the present invention can comprise substantially any gas which (a) undergoes little or no condensation at the temperatures and pressures at which the foam mixture is subjected, and (b) is substantially inert to and compatible with the foaming agent and other components of that mixture. Such a gas is preferably nitrogen but can comprise other substantially inert gases, such as carbon dioxide, air, ethane, methane, flue gas, fuel gas, or the like.

Two conditions will be prevalent in an override zone or high permeability zone, especially in a well-developed override zone. The steam or carbon dioxide flux in the override zone will be high relative to other portions of the reservoir because the vast majority of the flooding medium will be passing through the override zone. In addition, the residual oil saturation in the override zone will be relatively low due to continuous flooding.

One of the most desirable attributes of a good foaming agent is that it will work best in a low oil saturation area and at a high flux. The novel foaming agents of the present invention offer these substantial advantages with their affinity for the areas of low oil saturation and high flux.

The following examples will further illustrate the novel steam and carbon dioxide forming agents of the present invention. These examples are given by way of illustration and not as limitations on the scope of the invention. Thus, it should be understood that the composition and concentration of the foaming agents may be varied to achieve similar results within the scope of the invention.

EXAMPLES

The foaming abilities and foam stabilities of several ethoxy sulfate derivatives of lignin phenol products as well as samples of commercial foaming agents were determined. Samples were tested by varying brine salinity, surfactant concentration, and the presence of oil. Table 1 shows the lignin phenol ethoxy sulfates and commercial surfactants studied.

TABLE 1
LIGNIN PHENOL AND COMMERCIAL SURFACTANTS EVALUATED

| Compounds | Source | Hydrophobe | No. EO | Cation | Lignin Phenol Mol. Wt, g/mol |
|---|---|---|---|---|---|
| 1 Alipal CD-128 | GAF | $C_{8-9}$ | 2.5 | $NH_4^+$ | — |
| 2 Alipal EP-115 | GAF | $C_9O$ | 20 | $NH_4^+$ | — |
| 3 Polystep B-1 | Stepan | $C_9O$ | 1 | $Na^+$ | — |
| 4 LN-60COS | Texaco Chemical | $C_{12}6$ | | $Na^+$ | — |
| 5 CFD-162 | Texaco | Lignin Phenol | 6 | $Na^+$ | 294 |
| 6 CFD-163 | Texaco | Lignin Phenol | 11 | $Na^+$ | 294 |
| 7 CFD-329 | Texaco | Lignin Phenol | 5 | $Na^+$ | 389 |
| 8 CFD-330 | Texaco | Lignin Phenol | 14 | $Na^+$ | 389 |
| 9 CFD-331 | Texaco | Lignin Phenol | 8 | $Na^+$ | 240 |
| 10 CFD-332 | Texaco | Lignin Phenol | 14 | $Na^+$ | 240 |

The surfactants were evaluated in 50,000 ppm TDS, 100,000 ppm TDS, and 150,000 PPM TDS brines at pH 3. The concentration of the 100,000 ppm TDS brine was 26,200 ppm sodium ions, 63,800 ppm chlorine ions and 5,000 ppm each calcium and magnesium divalent ions. The other brines were prepared in proportionate amounts from the 100,000 ppm TDS brine. Solutions were prepared at pH 3 since this would be the approximate pH in a carbon dioxide flood. Surfactant concentrations looked at were 0.1%, 0.5% and 1.0%. Cations associated with the surfactants were ammonium for the two Alipal surfactants and sodium for the other foaming agents. The initial foam and foam stability tests were performed by vigorously shaking 10 ml of surfactant solution in a 50 ml graduated cylinder and then reading the initial and 15 minute foam volumes.

As expected, the two Alipal foaming agents and the Texaco LN-60COS surfactant were the best foamers. LN-60COS is a trademarked sulfated derivative of an ethoxylated alcohol having about 12 to 14 carbon atoms sold by Texaco Chemical Company having an average equivalent weight of about 550. The ethoxylated lignin phenol sulfates of compounds 5-10 of Table 1 were prepared in a Texaco research laboratory according to the procedure noted herein.

Several published papers have shown Alipal CD-128 as an excellent foaming agent for carbon dioxide floods. See SPE Paper No. 8370 by G. G. Bernard, L. W. Holm, and C. P. Harvey, "Use of Surfactants to Reduce Coz Mobility and Oil Displacement;" and SPE Paper No. 13492 by J. F. Casteel and N. F. Djbbarah, "Sweep Improvement in Carbon Dioxidefro Flooding Using Foaming Agents."

The lignin phenol ethoxy sulfate showed good foaming abilities. The best of these, surfactants numbered 7, 9 and 10 in Table 1 achieved initial foam volumes of ⅜ to ¾ that of the commercial surfactants Alipal EP-115 and LN-60COS and substantially exceeded the Polystep B-1 in foam volumes.

Foam volumes were also checked after 15 minutes in a brief test of foam stability. Most foams shrank substantially in volume including the Alipal CD-128. The Alipal EP-il5 and LN-60COS were the only two foams which did not substantially decrease in volume.

When salinity increased from 50,000 ppm TDS to 1100,000 and 150,000 ppm TDS, the foam volumes decreased. The foam stability of most of the commercial surfactants also decreased with increasing salinity. However, the lignin phenol epoxy sulfates showed increased stabilities at higher salinities, especially in 1% surfactant solutions.

Foam quality is a measure of the mount of gas in the foam and defined as the total gas volume present in the foam divided by the total foam volume. A 90% foam quality for example means the foam is composed of 90% gas and 10% liquid.

The foam quality of several of the lignin phenol ethoxy sulfates and the commercial surfactants was determined by mixing the surfactant solutions in a blender for 1 minute to produce foam. The contents of the blender were then poured into a graduated cylinder and the volumes of foam and liquid measured at different times.

The foam quality of most lignin phenol ethoxy sulfates was over 90%. The same was true of the commercial surfactants. This is positive since water can trap oil and prevent the carbon dioxide from contacting the oil in a carbon dioxide flood. The substantially similar behavior of the lignin phenol ethoxy sulfates in foam quality over time when compared to the commercial surfactants indicates that foam qualities are similar.

The critical micelle concentration of several commercial and lignin phenol ethoxy sulfate surfactants was measured. The object was to determine how well the lignin phenol ethoxy sulfates lowered surface tension compared to the well-known Alipal CD-128 foaming surfactant. Several solutions of surfactants were prepared at various concentrations and their surface tensions were measured with a du Nouy tensiometer. Before any measurements were taken, the tensiometer was calibrated.

Micelles were formed by the lignin phenol ethoxy sulfates at approximately the same concentration and surface tension as the Alipal CD-128 and another standard commercial surfactant, sodium dodecyl sulfate. At lower concentrations, the lignin phenol ethoxy sulfates lowered surface tension more than the commercial surfactants did. At concentrations above $10^{-2}$ moles/liter, Alipal CD-128 had a slightly lower surface tension (about 25-30 mdynes/cm$^2$ compared to about 35 mdynes/cm$^2$) than did the lignin phenol ethoxy sulfates. The best lignin phenol ethoxy sulfate was surfactant number 9 from Table 1.

Since adsorption is a great problem in the underground use of surfactants, adsorption was studied to determine how much surfactant is lost to clay. The clay used was a Western Bentonite consisting mainly of montmorillonite, having a large surface area of about 750 m$^2$ per gram of clay. Such a clay gives large adsorptions and helps to decrease experimental error.

Solutions of surfactants at various concentrations were prepared. One-half of each solution was maintained as a standard, and the other half was mixed with clay and shaken for 24 hours at room temperature. Both solutions, the standards and the solutions mixed with clay were analyzed by HPLC, equipped with a UV detector and integrator. A Waters μ-Bondapak Phenyl column was used ad the eluting solvent was a 100:40 mixture of isopropanol:water. The UV detector was set at 280 nm.

When the data was collected, a calibration curve for each surfactant was prepared. Each of the standards showed a linear relationship in its calibration curve. A plot of surfactant adsorbed per gram of clay versus the equilibrium surfactant concentration was made for each surfactant. Table 2 below lists the adsorption of each surfactant at its highest equilibrium concentration.

TABLE 2

ADSORPTION OF SURFACTANTS ON WESTERN BENTONITE

| Table 1 Ex. No. | Surfactant | Adsorption, mg/g clay |
|---|---|---|
| 2 | Alipal EP-115 | 277 |
| 9 | CFD-331 | 370 |
| 10 | CFD-332 | 316 |

The results show that similar adsorption levels were found for each of the three surfactants. Adsorption levels for the lignin phenol ethoxy sulfates were comparable to the Alipal foamer.

Corefloods

A lignin phenol ethoxy sulfate was tested as a foam diverter in parallel coreflood tests. Nitrogen was employed instead of carbon dioxide. It has been shown that high-pressure carbon dioxide can be simulated with low-pressure nitrogen for brine gas flow tests. See "Enhanced Oil Recovery By Carbon Dioxide Foam Flooding," DOE/MC/16551-6, June 1983.

Three parallel corefloods using nitrogen gas as the flooding agent were performed in Berea Sandstone cores measuring 2 feet × 2 inches × 2 inches, which were cast in epoxy, saturated with 50,000 ppm TDS brine, and measured for permeability to brine. The essential core data is shown in Table 3.

TABLE 3

| | CORE DATA | | | |
|---|---|---|---|---|
| Cores | RE-3 | RE-4 | RE-5 | RE-6 |
| Length (cm) | 60.9 | 60.9 | 60.9 | 60.9 |
| Vp (cc) | 299.2 | 324.0 | 311.7 | 334.2 |
| Permeability (mD) | 329.6 | 308.7 | 284.6 | 248.5 |
| Porosity (∅) | 0.210 | 0.223 | 0.221 | 0.220 |
| Bulk Density (g/cm³) | 2.037 | 2.032 | 2.058 | 2.065 |

The first experiment involved cores RE-5 and RE-6. An initial gas inlet pressure of 6 psig was used (at a 20–30 cc/min flow rate at 0 psi back pressure) to inject nitrogen into core RE-5 until no further brine was produced. Total brine produced was 126 cc and the final flow rate of produced gas from the core was 12.4 cc/min.

At this time, core RE-6 was opened to the gas flow. However, 100% of the gas flow continued through the first core RE-5, and no fluids were produced from the second core RE-6. Gas flow was then stopped and 30 cc of 1.0% surfactant solution (Table 1 surfactant number 10) in 50,000 ppm TDS brine was injected into the first core RE-5. Nitrogen was then opened to both cores and the production flow rates and volumes of produced brine were measured from both cores.

When both cores were opened to gas flow before the injection of the surfactant solution, 100% of the gas flowed through the swept core RE-5 and 0% of the gas flowed through the unswept core RE-6. After injection of the surfactant solution into the swept core RE-5, the nitrogen gas flow rate was reduced to 12% through the swept core RE-5. At the same time, flow rate through the unswept core RE-6 increased from 0% to 88% of total gas flow. Diversion by the foam produced from the lignin phenol ethoxy sulfate and the nitrogen non-condensable gas was substantial.

A second parallel coreflood was performed in a similar manner to the first parallel coreflood involving cores RE-5 and RE-6 discussed above. In the second coreflood, the gas inlet pressure was increased and was varied during the experiment. The results were approximately the same and corroborated the substantial diversion of gas noted in the first experiment.

A third coreflood was performed in exactly the same way as the first two corefloods, except that a 30 cc brine slug was injected instead of a 1% foaming surfactant in 30 cc brine slug.

In this third coreflood, nitrogen was injected into core RE-4 until no further brine was produced. The final production rate of gas was 11.8 cc/min and total brine produced was 128 cc. When the second core RE-3 was opened to nitrogen there was only gas flow through the first core RE-4, and no fluids were produced from the second core RE-3. Gas flow was stopped, and 30 cc of 50,000 ppm TDS brine was injected into the first core RE-4. Nitrogen was then opened to both cores and production flow rates and volumes measured.

Before injection of the brine slug, there was 100% flow rate through the swept core RE-4. After injection of the 50,000 ppm TDS brine slug into the swept core RE-4, the nitrogen gas flow was reduced to 41% through the swept core RE-4 while the flow rate through the unswept core RE-3 increased from 0% to 59%.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. In a steam flood or carbon dioxide flood in an underground hydrocarbon formation, the improvement which comprises:

injecting into an injection well about 0.05% to about 5% by weight aqueous surfactant solution which will foam and reduce the permeability of swept zones, forcing steam or carbon dioxide into unswept areas of the formation, said aqueous surfactant solution comprising a surfactant having the formula $$R(C_2H_4O)_nSO_4^- M^+$$

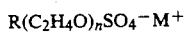

where R is a lignin phenol produced by reducing lignin in the presence of a reducing agent of carbon monoxide or hydrogen at a temperature greater than about 200° C. and a pressure greater than about 100 psi, n has an average value of about 2 to about 25, and $M^+$ is an alkali metal or ammonium cation; and injecting into the injection well a flooding medium of steam or carbon dioxide.

2. The method of claim 1, further comprising the injection of the flooding medium of steam or carbon dioxide into the injection well prior to the injection of the aqueous surfactant solution.

3. The method of claim 1, further comprising the injection of the flooding medium of steam or carbon dioxide concurrently with the injection of the aqueous surfactant solution.

4. The method of claim 1, wherein the flooding medium is steam, further comprising the injection of a non-condensible gas concurrently with the injection of the aqueous surfactant solution.

5. The method of claim 4, wherein the non-condensible gas is selected from the group consisting of nitrogen, carbon dioxide, air, methane, ethane and flue gas.

6. The method of claim 1, wherein the aqueous surfactant solution has a concentration of about 0.1% to about 1.0% surfactant.

7. The method of claim 1, wherein said aqueous surfactant solution is injected into a steam or carbon dioxide override zone.

8. The method of claim 1, wherein said aqueous surfactant solution is injected into an injection well prior to flooding medium breakthrough at a production well.

9. The method of claim 1, wherein said aqueous surfactant solution is injected into an injection well after flooding medium breakthrough at a production well.

10. In a steam flood in an underground hydrocarbon formation, the improvement which comprises:
    injecting into an injection well about 0.1% to about 1% by weight aqueous surfactant solution concurrently with steam and a noncondensible gas which will foam and reduce the permeability of swept zones, forcing steam into unswept areas of the formation,
    said aqueous surfactant solution comprising a surfactant having the formula:

$R(C_2H_4O)_nSO_4^- M^+$ where R is a lignin phenol produced by reducing lignin in the presence of a reducing agent of carbon monoxide or hydrogen at a temperature greater than about 200° C. and a pressure greater than about 100 psi, n has an average value of about 2 to about 25, and $M^+$ is an alkali metal or ammonium cation; and
    injecting steam into the injection well.

11. In a carbon dioxide flood in an underground hydrocarbon formation, the improvement which comprises:
    injecting into an injection well about 0.1% to about 1% by weight aqueous surfactant solution concurrently with carbon dioxide which will foam and reduce the permeability of swept zones, forcing carbon dioxide into unswept areas of the formation,
    said aqueous surfactant solution comprising a surfactant having the formula:

$R(C_2H_4O)_nSO_4^- M^+$ where R is a lignin phenol produced by reducing lignin in the presence of a reducing agent of carbon monoxide or hydrogen at a temperature greater than about 200° C. and a pressure greater than about 100 psi, n has an average value of about 2 to about 25, and $M^+$ is an alkali metal or ammonium cation; and
    injecting carbon dioxide into the injection well.

* * * * *